No. 704,674. Patented July 15, 1902.
J. F. BROWN.
SPRING BED BOTTOM.
(Application filed Feb. 13, 1902.)
(No Model.)

Witnesses.
Fred R. Sweet.
Walter Samariss.

Inventor:
John Franklin Brown
By Kay & Totten
Attorneys.

UNITED STATES PATENT OFFICE.

JOHN FRANKLIN BROWN, OF KNOXVILLE, PENNSYLVANIA.

SPRING BED-BOTTOM.

SPECIFICATION forming part of Letters Patent No. 704,674, dated July 15, 1902.

Application filed February 13, 1902. Serial No. 93,938. (No model.)

*To all whom it may concern:*

Be it known that I, JOHN FRANKLIN BROWN, a resident of Knoxville, in the county of Allegheny and State of Pennsylvania, have invented a new and useful Improvement in Spring Bed-Bottoms; and I do hereby declare the following to be a full, clear, and exact description thereof.

My invention relates to bed-bottoms of the kind provided with helical or similar springs; and its object is to provide means for securing said springs at their ends, so that they cannot get out of true vertical position, and in that way greatly increase the life of the springs.

In spring bed-bottoms provided with vertical helical or similar springs it is desirable that the springs be always maintained in a true vertical position. If they get out of vertical position and are then depressed, their elasticity is soon destroyed and the bed-bottoms soon become uneven. At the same time for commercial reasons it is necessary to have the uniting members for the top and bottom of the helical springs as simple as possible, so as to require little time in tying the springs together. This is usually done by having tie-rods running across the springs and key-rods running transversely to the tie-rods and interlocking with the springs and tie-rods. The most common form of tie-rods in present use are provided with loops which engage two adjacent springs in such a manner that said springs are held at three points around their end rings; but this will permit the springs moving sidewise out of their true vertical positions.

The object of my invention is to provide connecting means for the springs which are simple and easy of application, but which will nevertheless hold the springs in a true vertical position. To this end it comprises tie-rods provided with loops for engaging two adjacent springs which are so formed that each of the springs will be engaged at four instead of three points, and said loops are provided with hooks or crimps which engage the end rings of the springs and prevent the same from moving. The ordinary key-rod is employed with these tie-rods.

Figure 1:
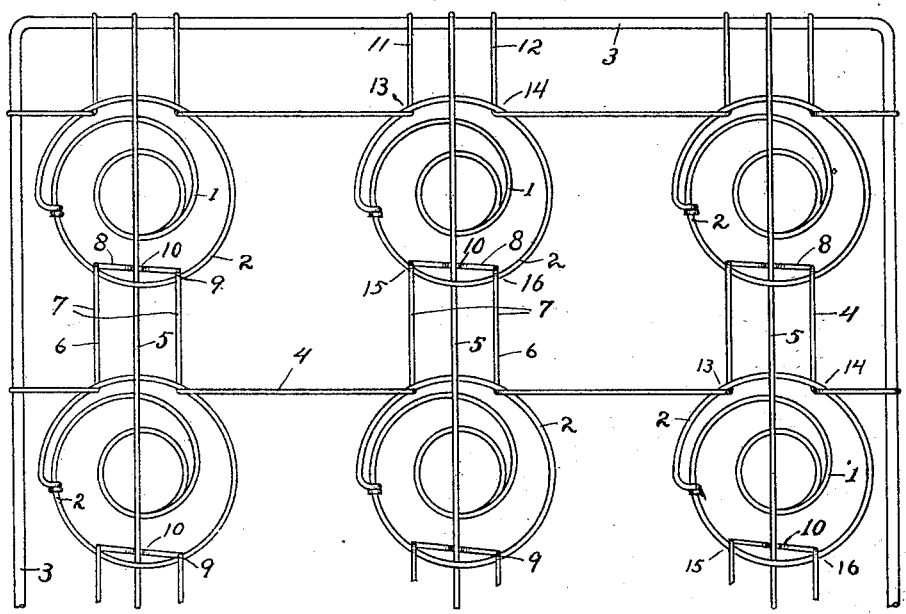
Figure 2:
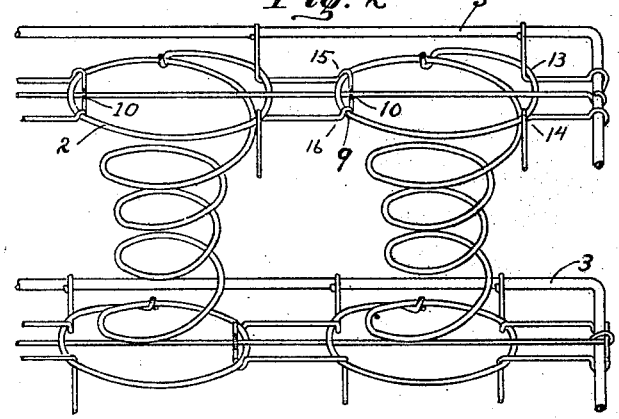
Figure 3:
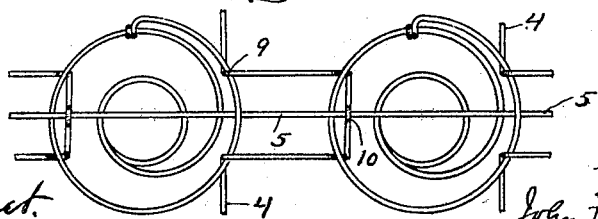

In the accompanying drawings, Figure 1 is a plan view of a portion of a bed-bottom made according to my invention. Fig. 2 is a perspective view of a portion thereof, and Fig. 3 is a plan view of a slightly-different arrangement of parts.

The bed-bottom is provided with some form of helical springs, those shown in the drawings at 1 being of the usual hour-glass type, although they may be cone-shaped or true helices. Each of these springs has the ends of the wire united to the coil, so as to form closed end rings 2. The usual frame 3, composed of heavy wire or small rods, may be employed; but this is not absolutely essential, as the tie and key rods may have their ends secured to the outside springs. The springs are set in rows, as shown, and they are united by means of the tie-rods 4 and key-rods 5, which have their ends connected to the frame 3 when the latter is used and extend across the rows of springs, with the key-rods at right angles or transversely to the tie-rods. The tie-rods 4 are provided at intervals with laterally-extending loops 6, which have practically parallel arms 7, united at their outer ends by the cross-bar 8. These loops extend through the end ring 2 of one row of springs and project over the end ring 2 of the adjacent row of springs, and the arms 7 of said loops are provided near their outer ends with the crimps or hooks 9, which take over the end ring 2 of the springs and prevent the same from moving laterally. The cross-bars 8 are also provided near their middle with a crimp or bend 10, which is made in the opposite direction from the crimps or hooks 9. As shown in Figs. 1 and 2, the loops of the tie-rods are threaded down through the top of one row of springs and extend over the tops of the next adjacent row of springs. Then the key-rods 5 are inserted, passing over the ring 2 on one side of the spring and under the ring at the opposite side thereof, but passing over the cross-bar 8 and lying in the crimp 10 thereof. The terms "over" and "under" are here used only relatively, for on the bottom of the springs, as shown in Fig. 2, just the reverse occurs. Fig. 3 shows a slightly different arrangement, in which the loop 6 passes up through the end ring 2 of one spring and extends under the corresponding ring of the next adjacent spring, and the key-rod passes over the ring 2 adjacent to the crimp 10 and under the same ring on the opposite side. In Fig. 2 I have shown this arrangement of tie and key rods both at the top and bottom of the mattress; but it will be understood that it need be used only at the top, the lower ends of the springs being held or supported in any convenient manner. The end rows of springs will be united to the frame 3 by ordinary tie-wires 11 and 12, as is now the practice.

With my form of tie-rod and loop the crimp 10 will hold the loop from moving sidewise on the key-rod 5, while the crimps 9 prevent the end ring of the spring from moving toward or away from the next adjacent spring, and as each end ring is engaged at four points at 13, 14, 15, and 16, which are a considerable distance from each other, it is practically impossible for the same to move sidewise, and the springs will be held in a true vertical position. As a consequence any weight on the springs will bear the same down in a straight line and their life will be greatly increased.

What I claim as my invention, and desire to secure by Letters Patent, is—

1. In a bed-bottom, the combination with helical springs arranged in rows and having their ends formed into rings, tie-rods extending across said springs, said tie-rods being provided with laterally-extending loops having substantially parallel arms and a cross-bar uniting their outer ends, said cross-bar being provided with a bend or crimp near its middle and having straight portions on either side of said crimp, said loops extending through two adjacent springs and engaging each at two points, and key-rods arranged transversely to the tie-rods and extending along said springs and through said loops and being engaged by the crimp in the cross-bar.

2. In a bed-bottom, the combination with helical springs arranged in rows and having their ends formed into rings, tie-rods extending across said springs, said tie-rods being provided with laterally-extending loops having substantially parallel arms and a cross-bar uniting their outer ends, said loops extending through two adjacent springs and engaging each at two points and being provided with crimps or hooks near their outer ends where they engage the springs, and key-rods arranged transversely to the tie-rods and extending along said springs and through said loops.

3. In a bed-bottom, the combination with helical springs arranged in rows and having their ends formed into rings, tie-rods extending across said springs, said tie-rods being provided with laterally-extending loops having substantially parallel arms and a cross-bar uniting their outer ends, said arms being provided near their outer ends with crimps or bends, and said cross-bar being also provided with a bend or crimp in the opposite direction, said loops extending through two adjacent springs and engaging each at two points and having the crimps near the outer ends of the arms engaging one of the springs, and key-rods arranged transversely to the tie-rods and extending along said springs and through said loops and being engaged by the bend or crimp in the cross-bar.

4. In a bed-bottom, the combination with helical springs arranged in rows and having their ends formed into rings, tie-rods extending across said springs, said tie-rods being provided with lateral loops extending through two adjacent springs and engaging each at two points and being provided with crimps or hooks near their outer ends where they engage the end rings of the springs, and key-rods arranged transversely to the tie-rods and extending along said springs and through said loops.

5. In a bed-bottom, the combination with helical springs arranged in rows and having their ends formed into rings, tie-rods extending across said springs, said tie-rods being provided with lateral loops extending through two adjacent springs and engaging each at two points and being provided with crimps or hooks near their outer ends where they engage the end rings of said springs, and key-rods arranged transversely to the tie-rods and extending over the end rings of the springs on one side thereof, under the same on the opposite side thereof and through said loops.

6. In a bed-bottom, the combination with helical springs arranged in rows and having both of their ends formed into rings, tie-rods extending across said springs both at the top and bottom thereof, said tie-rods being provided with lateral loops extending through two adjacent springs and engaging each at two points and being provided with crimps or hooks near their outer ends where they engage the end rings of the springs, and key-rods arranged transversely to the tie-rods both at the top and bottom of the springs and extending along said springs and through said loops.

In testimony whereof I, the said JOHN FRANKLIN BROWN, have hereunto set my hand.

JOHN FRANKLIN BROWN.

Witnesses:
G. C. RAYMOND,
ROBERT C. TOTTEN.